Figures 9, 10:
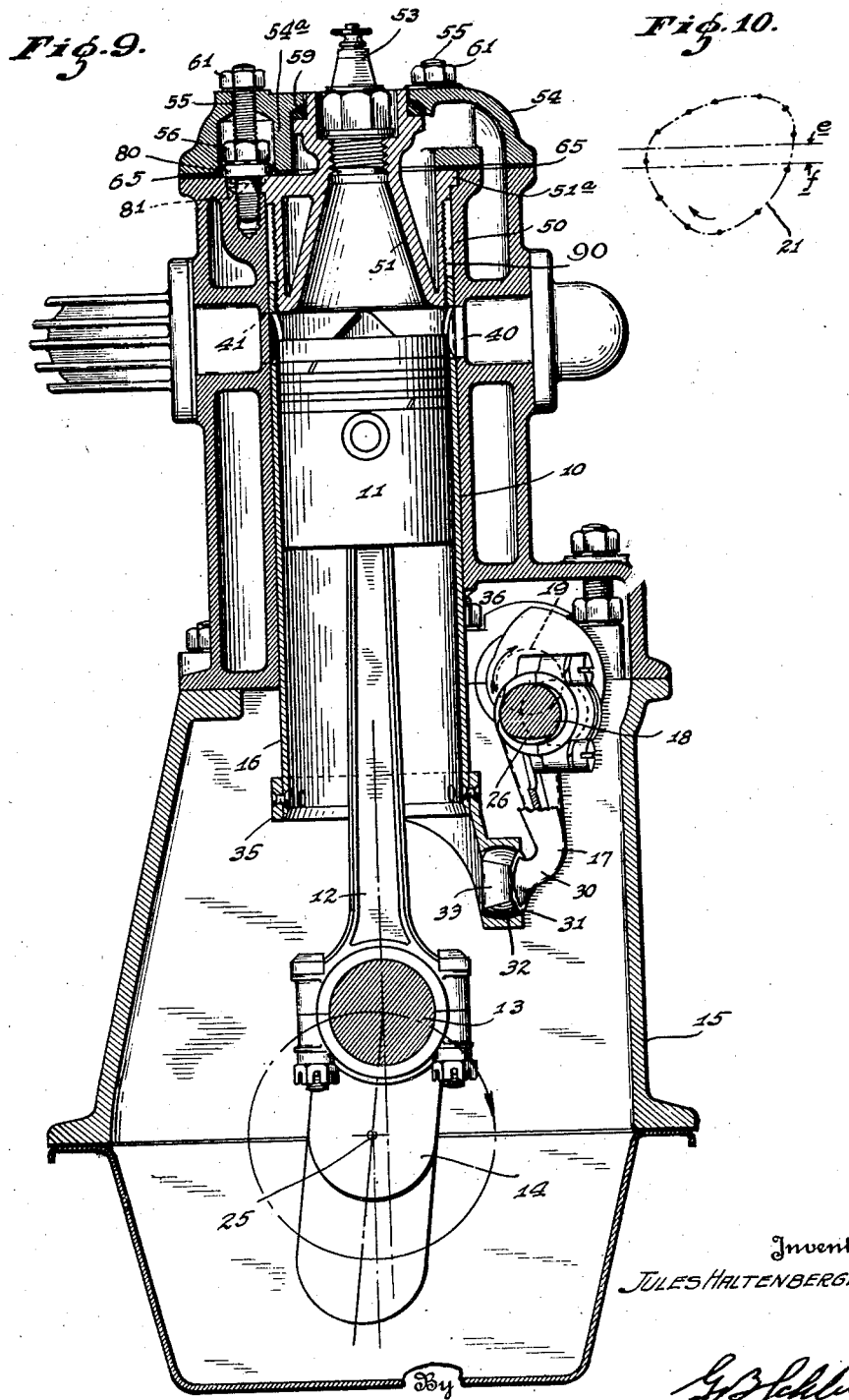

Dec. 8, 1931. J. HALTENBERGER 1,835,216
SLEEVE VALVE ENGINE
Original Filed April 12, 1926 3 Sheets-Sheet 1
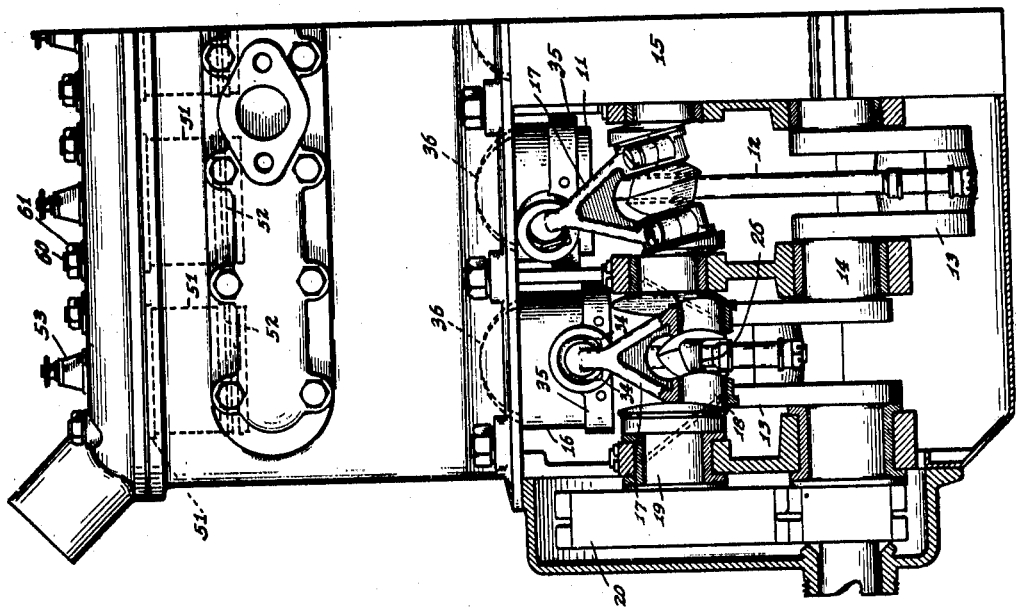
Inventor
JULES HALTENBERGER
By [signature]
Attorney

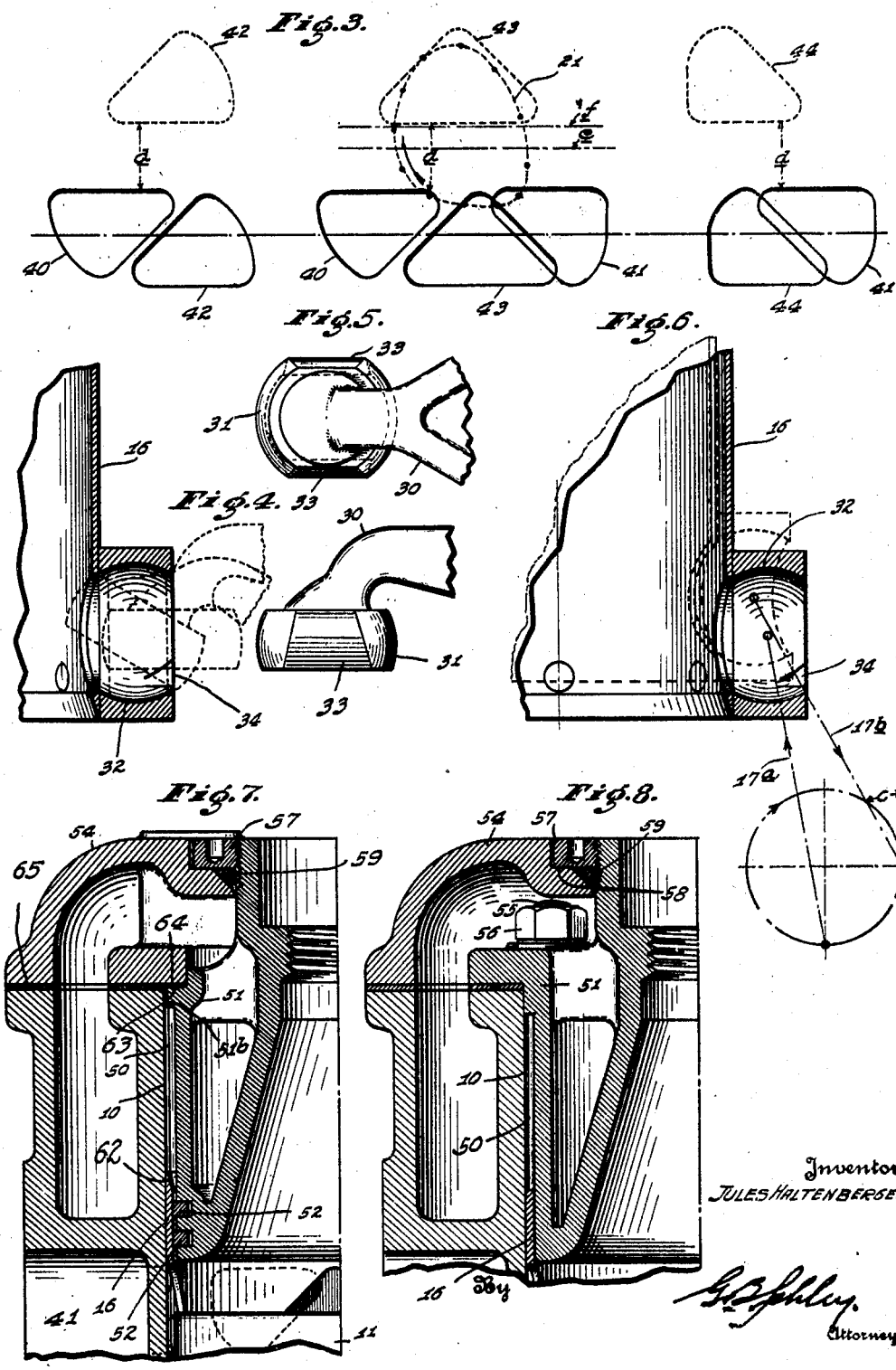

Dec. 8, 1931.  J. HALTENBERGER  1,835,216
SLEEVE VALVE ENGINE
Original Filed April 12, 1926  3 Sheets-Sheet 3

Inventor
JULES HALTENBERGER,
By
G. B. Schley,
Attorney

Patented Dec. 8, 1931

1,835,216

UNITED STATES PATENT OFFICE

JULES HALTENBERGER, OF INDIANAPOLIS, INDIANA, ASSIGNOR, BY MESNE ASSIGNMENTS, TO CONTINENTAL MOTORS CORPORATION, OF DETROIT, MICHIGAN, A CORPORATION OF VIRGINIA

SLEEVE-VALVE ENGINE

Application filed April 12, 1926, Serial No. 101,301. Renewed May 2, 1931.

It is the object of my invention to produce an internal combustion engine of the sleeve-valve type, and more especially of the single-sleeve-valve type, that has certain advantages over internal combustion engines of that general type now in use.

Although there are many other specific features, which will be referred to to some extent later, perhaps the fundamental object is to obtain certain advantages both in the sleeve-driving mechanism and in either the sealing action or the port-controlling movement between the ports in the sleeve and in the cylinder, by the combination of a special driving mechanism for the sleeve with a special arrangement at the head of the cylinder, whereby each of these is benefited in its action by the presence of the other. The special sleeve-drive involves a wobble-crank, or a crank arranged on the valve-operating shaft so that the crank axis is non-parallel and desirably non-co-planar with the shaft axis, which wobble-crank is connected directly by a sleeve-connecting-rod through a ball-and-socket joint to the sleeve-valve, to operate the latter with a combined axial reciprocation and circumferential oscillation and with a resultant closed-curved path of peculiar shape which has certain definite advantages in the sealing operation. The special arrangement at the head of the cylinder involves a plug which extends into the cylinder and has a sealing joint with the inside of the sleeve-valve at the upper end thereof, by which seal the explosion pressure is kept from acting against the upper end of the sleeve-valve; which has certain advantages in the wobble-crank sleeve-drive, whereby silent operation is produced by the substantial elimination of the reversal of forces on the sprockets or gears through which the valve-operating shaft is driven and by the resultant elimination of the whipping of the chain if a chain-drive is used, and by taking any slight remaining thrusts from the sleeve-valve upon the valve-operating shaft on oil-cushioned surfaces rather than on lines as in a gear drive. This makes it possible to obtain, as desired, either a quicker opening of the exhaust ports and a quicker closing of the inlet ports and a greater length of seal, or else a greater area of port opening, for a given height of sleeve-valve movements; or it makes possible a saving in the height of the engine and of the sleeve-valve movement, either without reducing the height of port-opening or without reducing the length of the seal. It may also minimize the effect of inaccuracies of workmanship both in the sleeve-drive and in the seal of the combustion chamber, and for the same reason minimize the effect of wear. It also saves the bearing surfaces of the valve-operating shaft, and makes it possible to use a smaller valve-operating shaft and a lighter chain-drive therefor.

While a non-co-planer wobble-crank sleeve-drive is not broadly new with me, since this feature per se is dominated by the Charles E. Sargent Patent No. 1,198,061, dated September 12, 1916, yet the combination of the non-co-planar wobble-crank sleeve-drive with the special cylinder-head arrangement above referred to is new so far as I am aware; and the Sargent arrangement, while it has many advantages which I retain, does not have the advantages above set forth. Further, while it is not broadly new with me to provide a sealing plug projecting into the upper end of the cylinder-head and sleeve-valve, since that is shown in various patents, in those patents the advantages which are obtained by the combination of such sealing-plug construction with the non-co-planar wobble-crank sleeve-drive are not obtained.

I shall not attempt here to enumerate all the other advantages which I aim to obtain and do obtain by my engine; but among them are included the following: the locating of the sleeve-driving shaft, which has the wobble-crank thereon, closer to the axis of the cylinder, while at the same time preventing interference between moving parts whose paths would normally overlap, which results in getting a better direction of force transmission between the wobble-crank and the sleeve; the locating of the center of the connection between the sleeve-valve and the sleeve-connecting-rod closer to the axis of the cylinder than has heretofore been possible, which results in an increase in the angle of circumferential oscillation for a given length of axial reciprocation of the sleeve-valve with consequent greater port openings, or in the reduction of the length of the axial reciprocation required of the sleeve-valve in order to produce a given port opening; the provision of larger and more efficient bearing surfaces at the connection between the sleeve-valve and the sleeve-connecting-rod, and the provision of such large bearing surfaces for all directions of force transmission, and especially downward and laterally, from the sleeve-connecting-rod to the sleeve-valve; the reduction in the dimensions of the engine as a whole, in height as well as in thickness, without diminishing the bore or stroke; the prevention of certain interferences for all positions of the main connecting-rod and the sleeve-driving connecting-rod and its directly associated parts, even though the driving connection between the sleeve-operating shaft and the crank-shaft is broken; the simplification both of the connection between the sleeve-valve and its operating mechanism, and of the putting together and separating of the parts which join at such connection; the location of such connection on the sleeve in such relation to the valve-operating shaft that the engine will not only be lowered in height thereby, but so that the strain on the sleeve-valve will be lessened and the support of the sleeve-valve will be increased in proportion to its length, and at the same time maintaining the wrist-pin of the main connecting-rod at all times within the cylinder proper and keeping both such main connecting-rod and the cylinder itself relatively short; the maintenance of the angle of the sleeve-connecting-rod with respect to the cylinder axis at a minimum at all times, while at the same time making that connecting-rod comparatively short; the lowering of the cylinder relatively to the piston, so that when the piston is at its highest point at the end of the exhaust stroke it will partly cover the ports in the cylinder and in the sleeve-valve while still leaving a partial passage through such ports; the provision of an advantageous shape of explosion chamber, with the spark plug at a cooler place and one readily accessible exteriorly; and the provision of this advantageous shape of combustion chamber by members which project into the upper ends of the cylinder and the sleeve-valve, and which are desirably carried in common by a removable cover by the removal of which all of such members may be withdrawn from the cylinders and sleeve-valves with which they normally co-operate.

In carrying out my invention in its preferred form, I desirably use the constructions shown in the accompanying drawings, which illustrate certain preferred forms of my invention. In such drawings, Fig. 1 is a vertical transverse section through an internal combustion engine embodying one preferred form of my invention, with the parts substantially in the position they occupy at the end of the exhaust stroke; Fig. 2 is a partial side elevation of such engine, with the crank-case and some of the parts within the crank-case in section; Fig. 3 is a port-timing diagram for the engine of Figs. 1 and 2, as shown by a development of the cylinder and the sleeve-valve in the port neighborhood; Figs. 4 and 5 are fragmental detail views of the ball at the sleeve-end of the sleeve-connecting-rod of Figs. 1 and 2, a fragment of the sleeve-valve also being shown in section in Fig. 4, to illustrate the connection and method of assembly of these parts; Fig. 6 is a semi-diagrammatic view showing a fragment of such sleeve-valve at the ball-and-socket connection thereof, and a diagram of the direction of the forces on the sleeve-connecting-rod in various positions; Fig. 7 is a fragmental enlargement of the upper part of Fig. 1; Fig. 8 is a fragmental section, generally similar to Fig. 7, but showing a modified construction in which a plain sealing surface without sealing rings is provided on the plug which depends into the upper end of the cylinder and sleeve-valve, and in which such plug is not removable with the cover; Fig. 9 is a view generally similar to Fig. 1, but showing another preferred form of my invention, in this case with the sleeve-connecting-rod extending generally downward from its valve-operating shaft to its point of connection with the sleeve-valve instead of generally upward therefrom as in Fig. 1; and Fig. 10 is a diagram of the travel-path of any point on the surface of the sleeve-valve in the arrangement shown in Fig. 9.

My invention is applicable to engines of any number and arrangement of cylinders but I illustrate it in connection with a multi-cylinder engine in which a plurality of cylinders 10 are arranged in a single plane, which is normally substantially vertical, each cylinder having within it a piston 11 connected by a main connecting-rod 12 to its corresponding crank 13 of a crank-shaft 14 arranged within a crank-case 15. A sleeve-valve 16 is slidable within each cylinder 10 between the cylinder wall and the associated piston 11. The lower end of each sleeve-valve 16 projects downward out of the lower end of its associated cylinder 10, and at such lower end is connected by a ball-and-socket joint (to be described in detail later) to a sleeve-connecting-rod 17 mounted on a wobble-crank 18 of a special valve-operating shaft 19 driven in any suitable way at half crank-shaft speed, as by a chain-drive 20 such as indicated in Fig. 2. The location of the valve-operating shaft 19 is generally below or generally above the ball-and-socket connection point of the sleeve-connecting-rod to the sleeve-valve, as indicated in Figs. 1 and 9 respectively, according as the engine is to be a high-torque low-speed engine or is to be a high-speed engine; but this will be discussed hereinafter. To save complication in the drawings, I have not shown in Fig. 1 the driving connection 20 between th crank-shaft 14 and the valve-operating shaft 19, as such drive is well understood. By reason of the wobble-crank 18, which is an eccentric crank whose axis is tilted out of parallelism with and out of the plane of the axis of the shaft 19 carrying such wobble-crank, the sleeve-valve 16 has a composite movement, including an axial reciprocation and an angular oscillation, which are so combined that any point on the sleeve-valve moves in a closed curve 21 (Figs. 3 and 10) as the valve-operating shaft 19 is rotated, to make a complete cycle for every two revolutions of the crank shaft. This closed curve is neither a circle nor an ellipse, but is more nearly egg-shaped, with the dividing line between the upper half-cycle and the lower half-cycle non-coincident with the line half-way between the high-point and the low-point in the cycle, so that the sleeve travels different vertical distances and has different average vertical speeds in said two half-cycles, and thereby has certain advantages which will appear hereinafter.

According to my invention, especially as exemplified in the structure shown in Figs. 1 to 6, the valve-operating shaft 19 is set closer to the axis of the cylinder 10 than has heretofore been possible with single-sleeve-valve engines. Several factors enter into the full accomplishment of this.

First, the axis 25 of the crank-shaft 14 is offset from the axis of the cylinder 10 on the other side of such axis from that on which the valve-operating shaft 19 lies; so that the main connecting-rod 12 will swing a shorter distance away from such axis on that side thereof on which said valve-operating shaft lies, and thus that shaft can be moved closer to the cylinder axis than would otherwise be possible. The offsetting of the crank-shaft axis 25 is not new per se, for it has other advantages in the transmission of power to the crank-shaft; but I believe I am the first to combine those advantages with the advantages to be obtained by the closer location to the axis of the cylinder of the valve-operating shaft of a single-sleeve-valve engine. This feature is of advantage in both the structure of Fig. 1 and the structure of Fig. 9.

A second factor in obtaining this close location of the valve-operating shaft 19 consists in making the shaft-end of the sleeve-connecting-rod 17 bifurcated, as is perhaps best shown in Fig. 2 although also shown in Figs. 1 and 9, so that the two prongs formed by such bifurcation will lie on opposite sides of the plane in which the associated main connecting-rod 12 swings; to allow such main connecting-rod to swing between them in the structure of Figs. 1 and 2, or to allow them to swing astride of the sleeve-valve in the structure of Fig. 9. In consequence, the valve-operating shaft 19 may be moved still closer to the axis of the cylinder, since the path of the main connecting-rod 12 or of the sleeve-valve may overlap without interference the non-co-planar paths of the prongs of the sleeve-connecting-rod 17, as viewed along the axes of the shaft as in Fig. 1.

To permit this overlapping of these paths to be greater, the outer side of the wobble-crank 18 is partly cut away at its middle portion, between its two end portions on which the two prongs of the sleeve-connecting-rod 17 have their bearing. Such cutting away of the outer side of the wobble-crank 18 is desirable on a cylindrical surface 26 whose axis is the axis of the valve-operating shaft 19, and is sufficient so that this intermediate portion of the wobble-shaft does not overlap the path of the co-planar main connecting-rod 12 (Fig. 1) or of the co-planar sleeve-valve (Fig. 9), even though the paths of the non-co-planar end portions of the wobble-crank do overlap the path of the main connecting-rod or of the sleeve-valve. By thus permitting the end or bearing portions of the wobble-crank to overlap the path of the main connecting-rod 12 (Fig. 1) or of the sleeve-valve (Fig. 9), it becomes possible to put the valve-operating shaft 19 still closer to the axis of the cylinder.

Further, by thus avoiding an overlapping of the paths of the main connecting-rod 12 or of the sleeve-valve and the middle or non-bearing portion of the wobble-crank 18 by cutting the latter away along the cylindrical surface 26 co-axial with the shaft 19, interference is avoided regardless of the variation in timing, or of a break in the driving connection 20 between the crank-shaft 14 and valve-operating shaft 19.

To compensate for possible loss of strength due to this cutting away of the outer side of the wobble-crank 18, the inner side of such wobble-crank, or the side toward the axis of the shaft 19, may be thickened at the middle, or between the two bearing portions which carry the prongs of the sleeve-connecting-rod 17. This is perhaps best illustrated in Fig. 2. The metal added by this thickening is kept within the complete cylinder of which the surface 26 forms a part, so that it will not interfere with any movement of the main connecting-rod in its travel. This added metal is also somewhat beveled toward the end or bearing portions of the wobble-crank to avoid interference with the prongs of the associated sleeve-connecting-rod in the wobble movement.

These different factors co-operate in making it possible, both in the structure of Fig. 1 and in that of Fig. 9, to put the valve-operating shaft 19 close to the axis of the cylinder 10, or to the plane of the axes of the row of cylinders 10. This has several advantages. First, it lessens the necessary thickness of the engine. Second, it lessens the distance between the axes of the crank-shaft and the valve-operating shaft, so that smaller gears or shorter chains may be used to interconnect them. Third, and chiefly, it makes the direction of the forces transmitted by the sleeve-connecting-rod 17 more nearly in line with the direction of longitudinal reciprocation of the sleeve-valve 16, as is illustrated diagrammatically in Fig. 6 for the structure shown in Fig. 1, so that that component of such force which is transverse to the sleeve-valve axis will be reduced to a minimum, with resultant saving in both wear and transverse stresses on the sleeve. Further, by this reduction in the angle between such direction of force and the sleeve-valve axis, it becomes possible to make the sleeve-connecting-rod materially shorter while still maintaining such angle well within the limit for effective operation; and as a result the shortening of the sleeve-connecting-rod makes possible a material reduction in the height of the engine.

Fig. 6 shows the direction of forces transmitted by the sleeve-connecting-rod 17 of Fig. 1 for two positions of the sleeve-operating shaft 19, and corresponding positions of the sleeve-valve 16. In Fig. 6, however, the sleeve-connecting-rod 17 is not shown in its actual shape, but straight lines of force-transmission 17$^a$ and 17$^b$ are substituted instead; as those lines indicate the true direction of the force-transmission, which are in a straight line between the pivotal centers at the two ends of the sleeve-connecting-rod 17 regardless of the actual shape of such sleeve-connecting-rod. The line 17$^b$ shows substantially the maximum angle of the force-transmission; and this angle, which is the angle $c$, is a comparatively small angle and is readily made less than the maximum permissible angle for such direction of force-transmission.

The force-direction diagram for the structure shown in Fig. 9 is substantially that of Fig. 6 inverted; but the nature of the angles is substantially the same in both cases.

However, the sleeve-connecting-rod 17 is not made as a straight rod, although it transmits forces along a straight direction line; but is made as an angle rod. That is, it is made so that its body extends out of the force-transmission line, but its sleeve end 30 is bent inward toward the sleeve-valve. This sleeve end is the upper end in Figs. 1 to 6, but is the lower end in Fig. 9. This inwardly bent sleeve end carries the ball member 31 of the ball-and-socket joint between the sleeve-connecting-rod 17 and the sleeve-valve 16; and this ball member fits in a socket member 32 carried by the sleeve-valve 16. By making the rod 17 as an angle rod, and mounting the ball member 31 on the inwardly bent sleeve end thereof, full and efficient bearing surfaces are provided between the ball member and the socket member on the lower side of the ball-and-socket joint, directly in the line of force-transmission, and on the lateral sides thereof for transmitting the lateral forces in circumferentially oscillating the sleeve-valve, as well as on the lower side thereof; which is not possible with a straight sleeve-connecting-rod.

In addition, the ball member 31 is made as only a segment of a sphere, those portions of what would otherwise be a complete sphere which are toward and away from the sleeve-valve being cut off to leave only a central section of a sphere for the ball member 31. Further, a greater portion of the sphere is cut off on the inner side of the sphere, or on the side toward the sleeve-valve 16, than on the outer side thereof.

This has several advantages. First, it makes it possible to put the center of the ball-and-socket joint closer to the axis of the sleeve-valve, for such center may thus readily be placed nearer to the inner face of the sleeve than the radius of the ball-and-socket joint, and yet not interfere with the passage of the piston-skirt downward on the inside of such sleeve past the ball-and-socket joint, which passage occurs in the structure shown in Figs. 1 to 6. This is helped by the cutting off of a greater part of the complete sphere on the inner side than on the outer side. At the same time, in the structure shown in Fig. 1, this unequal cutting off more nearly equalizes the effective bearing areas of the ball-and-socket joint for lateral stresses on the sleeve-valve during upward and downward movement, for with both shafts 14 and 19 moving clockwise (as viewed in Fig. 1 and Fig. 6 for instance) the force-direction line 17$^b$ (Fig. 6) is at its worst angle when the sleeve-valve is being pulled downward, and the greater area of the ball-and-socket joint towards the outer side then comes into effective play to hold the ball member 31 against being pulled out of the socket member 32. This greater area toward the outside also serves more effectively, in the structure shown in Fig. 1, to resist the drag from the sleeve-operating shaft 19 upon the sleeve-connecting-rod 17 tending to rotate that with the shaft 19 in a clockwise direction (Fig. 1) and thus to pull the ball member 31 out of the socket member 32.

By locating nearer to the sleeve-valve the center of the connection thereto of the sleeve-connecting-rod, an increase is obtained in the cycle of circumferential oscillation of the sleeve-valve for a given length of axial reciprocation; which increases the port areas obtainable.

By making the ball member 31 a segment of the sphere, it also becomes possible to facilitate putting the parts together and taking them apart. That is, the sleeve-connecting-rod 17 with its ball member 31 may be tilted from its operating position shown in Fig. 1, in which the inner and outer cut-away faces of the ball member are generally more or less vertical, to the position shown in Fig. 4, in which such faces are generally more or less horizontal. With the ball member in this position, it can be slipped into and out of the socket member 32 if such ball member is also cut away on the sides toward and from the observer (Figs. 1, 4, and 9) on surfaces 33 which lie within the circle of the opening on the outer side of the socket member 32. Figs. 1, 4, and 9 each show one of these additional cut-away surfaces 33, and Fig. 5 shows both of them. These surfaces 33 are curved surfaces of a curvature substantially corresponding to the curvature of the circular opening in the outer face of the socket member 32, on an axis which extends through the center of such opening and of the ball-and-socket joint when the ball member 31 is in the position shown in full lines in Fig. 4; although the intersections of the general spherical surface of the ball member 31 with such surfaces 33 appear substantially as straight lines in Fig. 4. The advantages of this arrangement apply equally to the structure of Fig. 1 and to the structure of Fig. 9.

In order further to facilitate putting the parts together and taking them apart, the horizontal diametrical plane of the tilted ball member 31 is displaced slightly away from the center of the socket member 32 during such putting together and taking apart, the displacement being in the opposite direction from that from which the sleeve-connecting-rod 17 projects from the ball member. This is below such center in the structure of Figs. 1, 2, 4, and 5; and may also be below such center in the structure of Fig. 9, by turning the ball-member around in its socket before removal from or after insertion into the socket member 32, so that the sleeve-connecting-rod 17 will be above the ball member during insertion and removal. To permit this displacement, the outer opening in the socket member 32 is notched at the two corners 34 on the side toward which such displacement is made, as is clear from Fig 2; and the ball-carrying end of the sleeve-connecting-rod 17 is beveled off as shown in Figs. 1, 4, and 9.

In this arrangement of parts, the ball-and-socket joint of the structure shown in Figs. 1, 2, 4, and 5 may be assembled by moving the ball member 31 from its outside position shown in full lines in Fig. 4, through the horizontal and oblique dotted-line positions also shown in that figure, to the full-line position shown in Fig. 1; and may be removed by a reversal of those operations. For the structure shown in Fig. 9, these operations may be the same, save that the ball member 31 is turned in its socket after insertion or before removal, so that the sleeve-connecting-rod 17 may be above the ball member during such insertion and removal.

By reason of this manner of assembly, the socket member 32 may be made as a single integral member, instead of being made of parts bolted together to permit the insertion and removal of the ball.

While this socket member 32 may be formed directly on the sleeve-valve 16, my preferred construction contemplates having such socket member on a separate ring 35; which is suitably attached, as by rivets, upon the lower end of the sleeve-valve. This makes it possible to make the sleeve-valve 16 fundamentally out of plain drawn or cast tubing and to finish its outer surface throughout its whole length with ease, thus saving both material and labor.

The ring 35 in the structure of Figs. 1 to 6 is of the full height of the socket member 32 only at such socket member, and is made of considerably less height throughout the remainder of its circumference, as is indicated in dotted lines in Fig. 1. This makes it possible to put the center of the ball-and-socket joint higher on the sleeve-valve 16 with respect to the bottom of the cylinder 10 than would otherwise be possible; and thus lessens the amount by which the sleeve projects from the cylinder for a given sleeve-valve position, and so lessens the wear and bending strain on the sleeve-valve and cylinder. It also lowers the height of the engine. To do this, however, the lower end of the cylinder 10 is provided with a recess 36 in general over the socket member 32, to receive such socket member and the upper end of the sleeve-connecting-rod 17. This recess 36 is of sufficient circumferential extent to permit the angular swing of the sleeve-valve 16 when it is at the top of its path 21; for this recess 36 extends only for a comparatively small angle as compared with the entire circumference, and lets the cylinder for the remainder of the circumference project downward around the sleeve-valve to serve as a guide therefor without interference from the ring 35.

The structure of Fig. 9 also has the ring 35 as a ring of comparatively small height throughout the greater part of its circumference; but here the socket 32 is offset downward from the body of the ring, and is actually below the lower end of the sleeve-valve 16, instead of being offset upward from the body of the ring as in the structure of Figs. 1 to 6. This difference is because in the structure of Fig. 9 the sleeve-connecting-rod 17 extends upward from the socket 32, instead of downward therefrom as in the structure of Figs. 1 to 6 inclusive. In the structure shown in Fig. 9, the lower end of the cylinder 10 is provided with substantially the same recess 36, in general lying over the socket member 32; and this recess, as in the structure of Figs. 1 to 6, is to accommodate the upper end of the sleeve-connecting-rod 17 in its movements, although such upper end in this case is the end which is connected to the wobble-crank 18, instead of the end which is associated with the socket member 32 as is the case in the structure of Figs. 1 to 6 inclusive. In both structures, the recess 36 extends only for a comparatively small angle as compared with the entire circumference, and lets the cylinder for the remainder of the circumference project downward around the sleeve-valve 16 to serve as a guide therefor.

In order further to lessen the height of the engine, I lower the cylinder 10 slightly with respect to the high point of the piston 11 over what is the ordinary practice. That is, in ordinary practice the cylinder is at such height with respect to the high point of the piston that the piston does not overlap the ports in the cylinder or in the sleeve-valve at any time. I lower the cylinder so that the lower line of the ports in the cylinder is lower than the top of the piston when the piston is at the top of its stroke. This lessens the height of the engine by the amount by which the piston may overlap the cylinder ports.

Desirably I do not lower the cylinder with respect to the piston to produce a complete overlapping of the piston with the cylinder ports, but only produce a partial overlapping; because it is usually desirable that the exhaust ports of an engine should not be closed exactly at the high point or dead-center position of the piston, but should remain open until a few degrees later in the cycle, and this would be prevented if the piston when at its high point completely overlapped the cylinder ports.

This is clear from Figs. 1, 3, and 9. Figs. 1 and 9 show the piston substantially at its high point at the end of the exhaust stroke, with the top of the piston about midway of the height of the inlet ports 40 and exhaust ports 41 in the cylinder; and Fig. 3 shows diagrammatically in full lines, for the structure of Figs. 1 to 6, the relative positions of these inlet and exhaust ports 40 and 41 in the cylinder and of the co-operating ports 42, 43, and 44 in the sleeve-valve at the same point in the cycle that is indicated in Fig. 1. It will be noted that the sleeve-valve ports 43 and 44 still slightly overlap the exhaust ports 41 in the cylinder, to permit an outflow passage for the exhaust gases, even though the piston is at the top of its stroke and is partly overlapping such ports. This same partial opening of the exhaust passageway out of the cylinder at this point in the cycle is also indicated in Fig. 1, in the ports 41 and 43 which appear just behind the axial line of the cylinder. This overlapping of the ports by the piston is the same for the structure of Fig. 9, although the shape of the ports may be different from what is shown in Fig. 3 because of the different travel-path 21 (Fig. 10) which is produced in the structure of Fig. 9 by reason of having the sleeve-connecting-rod 17 extend upward from the socket member 32 instead of downward therefrom as in the structure of Figs. 1 to 6.

In other words, in the structures of both Figs. 1 and 9, the relative arrangement of the piston and cylinder is desirably such that when the piston is at its high point at the end of its exhaust stroke, or on dead-center position, there still remains uncovered a portion but less than all of the then-overlapping parts of the exhaust ports in the cylinder and in the sleeve-valve.

The port 43 in the sleeve-valve is shown as a double-purpose port, co-operating both with an inlet port 40 and an exhaust port 41 in the cylinder, but that is an incident, and not an essential.

The upper end of the sleeve-valve 16 desirably works within an annular pocket 50 formed between the upper end of the cylinder and a plug 51 which projects downward into the upper end of the cylinder. This plug 51 may have one or more expansion rings 52, similar to piston rings, as is illustrated in Figs. 1 and 7, for bearing against the inner surface of that portion of the sleeve-valve which projects into the pocket 50, to provide a seal between such pocket and the explosion chamber; and because of the length of the sealing distance $d$ (discussed later) in the structure of Fig. 1, it is possible to get two expansion rings 52 within that space, to seal the explosion chamber at the moment of explosion against leakage through the ports 42, 43, and 44 of the sleeve-valve, which is not possible with a circular or elliptical travel-path in place of the egg-shaped travel-path 21 for the same total length of sleeve-valve axial reciprocation.

If desired, the expansion rings 52 may be omitted, as is illustrated in Figs. 8 and 9 to provide a surface joint directly between the inner surface of the sleeve-valve 16 at the upper end thereof and the outer surface at the lower end of the plug 51; and here also the long sealing distance $d$ of Fig. 1 is of great advantage, especially in high-torque low-speed engines.

It is most desirable, and is one of the elements of a fundamental invention here involved, that the plug 51 seal against the inner surface of the sleeve-valve 16, as by the plain bearing of Figs. 8 and 9 or the expansion-ring construction of Figs. 1 and 7, to keep the pressure within the explosion chamber from acting on the end of the sleeve-valve 16 in the piston movement of the latter. By thus keeping the sleeve-valve free from axial force from the explosion, silence in operation is promoted by the substantial elimination of the reversal of forces which would otherwise be produced on the sprocket and gears through which the valve-operating shaft 19 is driven, and by the resultant elimination of the very objectionable whipping which occurs in the chain of the chain-drive 20, especially at certain critical speeds. Any slight remaining thrust from the sleeve-valve upon the valve-operating shaft, due to the drag of the piston through its piston rings on the sleeve-valve as the piston moves downward, is taken by oil-cushioned surfaces in the wobble-shaft drive, which makes for silent operation in comparison with the taking of such thrusts on the mere lines of tooth-engagement in a gear drive.

While it is thus desirable to provide a seal between the plug 51 and the sleeve-valve 16, and while that is necessary for certain features of my invention in its more fundamental aspect, still there are certain details of my invention which are not dependent on that seal but include constructions in which no such seal is used and the explosion pressure may act against the upper end of the sleeve-valve 16 to make such sleeve-valve itself a source of power in its piston movement of reciprocation.

The plug 51 is desirably substantially frusto-conical on its inner surface, with the cone an acute cone, as is clear from Figs. 1, 7, 8, and 9, to provide a desirable shape of explosion chamber and to permit the spark plug 53 to be located relatively high and at a place which is at once cool and accessible. This acute frusto-conical shape is desirable for suitable flame propagation. This shape is advantageously possible, however, only by reason of having the entire cylinder set lower with respect to the high point of the piston stroke, so that the piston overlaps the ports in the cylinder wall; as otherwise the provision of this shape for the interior of the plug 51 would result in making the explosion chamber too large to obtain the necessary compression, so that it would be necessary to make the cone very obtuse, if not almost flat; which would result in less effective flame propagation and would make it necessary to put the spark plug in a place which is at once less accessible and considerably hotter. Thus the acute form of the frusto-conical shape of the inner surface of the plug 51 is very desirable.

If the plugs 51 have a surface sealing with the sleeve-valve 16 as indicated in Figs. 8 and 9, it is desirable to have them separate from the cover 54. In that case, the plugs may be separately attached to the cylinder block, as illustrated in Fig. 8, by studs 55 and nuts 56; and the cover is set over these studs and nuts, with the upper ends of the plugs projecting through the cover and provided with some suitable sealing joint therewith, as by nuts 57 which are threaded on the upper exposed ends of the plugs 51 and bear against counterbored shoulders 58 in the cover, with sealing rings 59 of rubber or other suitable resilient material compressed between such nuts 57 and countersunk tapered surfaces in the recesses which receive the nuts 57. This leaves the hollow upper ends of the plugs 51 open to the outside for the insertion of the spark plugs 53.

The plugs 51, when they have a surface sealing with the sleeve-valve 16, may be mounted as shown in Fig. 9; and that is the mounting I prefer. There the upper end of the cylinder is counter-bored, to receive an outwardly projecting flange 51a at the top of the plug 51. This counterboring may be accurately done by the well-known piloting counterboring tool, to get the bottom surface of the counterbore accurately perpendicular to the axis of the cylinder; and the bottom surface of the flange 51a may also be accurately ground perpendicular to the axis of the plug, so that a tight metal-to-metal joint may be obtained between the bottom surfaces of the flange and the counterbore, with the axis of the plug accurately co-incident with the axis of the cylinder to prevent the plug from binding against the sleeve-valve. The plug 51 shown in Fig. 9 may be held down in place, to make such metal-to-metal joint tight, by washers 80 and nuts 56 on the studs 55. These washers overlap the flange 51a inwardly from such studs and bear upon the end of the cylinder outwardly from such studs, with such cylinder end cut away at the sides of the studs, as by eccentric counterbore 81, so that the washers 80 will have bearing only inwardly and outwardly radially of the cylinder, and the nuts 56 will force them downward to seat the flange 51a firmly in spite of any slight variations in the vertical height of the flange 51a and of the counterbore which receives such flange. The cover 54, as a whole, which may extend over the ends of all the cylinders, may be held down by nuts 61. In the structure shown in Fig. 9, these nuts 61 are indicated as being mounted on extensions of the same studs 55 which receive the nuts 56 and washers 80; but in the other views the nuts 61 are received on separate studs 60 extending upward from the cylinder block.

In all the structures shown, a gasket 65 is interposed between the cylinder block and the cover 54. This gasket serves in Fig. 9, to furnish a second seal for the plug 51, to hold any slight leakage, if any occurs, which may get by the metal-to-metal between the bottom of the flange 51a and the bottom of the counterbore which receives such flange; so that it forms a secondary seal.

In the construction shown in Fig. 9, the central part of each plug 51 may project up through the cover 54, and have a sealing joint therewith, as by sealing rings 59.

The holding down of the plug 51 by the washers 80 and nuts 56 is to some extent supplemented by legs 54ª which project downward from the cover against the gasket 65 over the plug 51 inwardly from the flange 51ª. These legs 54ª, however, also serve as separating walls for the water passages, if water passages are provided; and as separating walls for the recesses provided in the cover to receive the nuts 56 and washers 80.

In the construction shown in Fig. 9, it is desirable that the outer face of the plug 51 which face forms one wall of the pocket 50 may have a series of circumferential grooves 90 thereon. This improves the sealing surface, by providing a labyrinth bearing. The ridges between adjacent grooves are desirably V-shaped, so that in case of any inaccuracies in machining or assembling they readily wear away slightly to accommodate the movements of the sleeve-valve 16. Further, these circumferential grooves effectively prevent "gathering" of the metal on the cooperating surfaces of the sleeve-valve and plug, and also prevent the scoring; so that it makes it unnecessary to "baby" a new engine in its early operation.

Unless the plugs 51 have a surface sealing with the sleeve-valves 16, such as is indicated in Figs. 8 and 9, I prefer to mount such plugs directly in the cover 54 to be removable therewith, as is illustrated in Figs. 1, 2, and 7. In this arrangement, the plugs for the cylinders for the entire row of cylinders are carried in common by the cover 54, which is attached to the cylinder block by the studs 60 and nuts 61. By removing the nut 61, the cover 54 may be removed as a unit, and the plugs 51 removed with it. If the rings 52 are provided, as I prefer they should be when there is no surface sealing in order to prevent the explosion pressure from acting axially on the end of the sleeve-valve, they are also removed with the cover 54 and the series of plugs 51. When the plugs 51 are thus attached to the cover, the clearance between the actual surface of the plugs themselves and the inner surface of the sleeve-valve compensates for errors in machining and inequalities in heat expansion of the cover and the cylinder block. However, in order to guide the plugs 51, I desirably provide peripheral pilot flanges 51ᵇ at their upper ends over the pockets 50, with just sufficient clearance for such pilot flanges in the upper end of the cylinders 10 to allow for slight inaccuracies of machining and for the maximum differential heat expansion.

By having the plugs 51 all mounted in common on the cover 54, their removal and replacement as for decarbonizing the engine, is greatly facilitated.

To facilitate the insertion of the plugs 51 into the sleeve-valves 16, especially when such plugs carry the rings 52, the upper ends 62 of the sleeve-valves are desirably taper-bored, as is clear from Figs. 1 and 7.

Although in the structure of Fig. 1 the plugs 51 are removable with the cover 54; and carried thereby, such plugs are desirably separable from such cover; but they are rigidly attached thereto by the nuts 57 which screw on the upper exposed ends of the plugs 51 and in this case (Figs. 1 and 7) draw shoulders 63 on such plugs against the bottom faces of the cover 54, usually with a thin interposed gasket 64 at each of such shoulders. The nuts 57 here are also received in suitable depressions from the top of the cover 54, with the sealing rings 59 between the upper ends of the plugs 51 and countersunk tapered surfaces in the recesses which receive such nuts.

In this construction also there is a gasket 65 between the cylinder block as a whole and the cover 54 as a whole, which gasket is a unitary gasket for the entire cylinder block, so that it may be put in place with ease.

The cylinder block, the cover, and the plugs may, if desired, be cored for water-cooling, as is illustrated in Figs. 1, 7, 8, and 9; but my invention in this application is not concerned with the nature of the cooling of the engine, and is applicable to engines cooled in any desired way, and the details of the water-cooling system which I show by way of example constitute no part of my present invention covered by this application.

In Fig. 3 I have shown in development the shape of the various ports 40 to 44 for the wobble-crank drive of Figs. 1 and 2, with the sleeve-valve ports 42, 43, 44 shown in full lines in their position with relation to the cylinder ports 40 and 41 at the end of the exhaust stroke, but with such sleeve-valve ports shown in dotted lines in the relative positions they have at about the beginning of the explosion stroke. With this wobble-crank drive of Figs. 1 and 2, the travel-path of any point on the outer surface of the sleeve-valve is substantially that shown by the travel-path 21 in Fig. 3. On that travel-path are a series of points or dots which indicate the positions at 30° intervals in the movement of the valve-operating shaft 19, or 60° intervals in the movement of the crank-shaft 14. The complete cycle indicated by the travel-path 21 may be divided into upper and lower halves, by a mid-cycle line $e$. It will be noted that this line is considerably below the half-way line $f$ between the high point and the low point in the travel-path 21. The port opening and closing movement is generally in the lower half of the cycle, in the arrangement shown; or is for the most part below the mid-cycle line e, although not entirely so because the combined periods of the intake and exhaust total more than one-half of the cycle. On the other hand, the sleeve-valve movement which at the beginning of the explosion stroke produces sealing between the plug 51 and the sleeve-valve 16 is in the upper half of the cycle, or above the mid-cycle line e. Because, in this construction, the height of the cycle above the mid-cycle line e is increased by the peculiar shape of the travel-path 21, and by the resultant displacement downward of the mid-cycle line e from the half-way line f, this sealing distance d is materially increased. This is indicated by the great length of the sealing distance d in Fig. 3. This is sufficient to permit two expansion rings 52 to be used in that distance, to improve the seal between the upper edges of the cylinder ports 40 and 41 and the lower edges of the sleeve-valve ports 42, 43, and 44 at the moment of explosion. This wide sealing distance is due to having the valve-operating shaft 19 with its wobble-cranks located below the socket 32, as in Figs. 1 and 2; and is of especial advantage in high-torque low-speed engines.

However, this increase of sealing distance is obtained at the expense of the height of the ports, for a given length of axial movement of the sleeve-valve; for as the sealing distance is increased the height of the ports must decrease. If it is desired to increase the height of the ports, that may be done at the expense of the sealing distance, by putting the valve-operating shaft 19 and its wobble-cranks above the sockets 32, as is illustrated in Fig. 9, instead of below such sockets as in Figs. 1 and 2. The travel-path 21 for any point on the outer surface of the sleeve-valve in Fig. 9 is illustrated in Fig. 10. This figure also shows the points or dots at 30° intervals of the valve-operating shaft movement. Here, as will be seen, the mid-cycle line e is above the half-way line f; which makes the lower or port-opening and port-closing half of the cycle of greater axial height than the upper or sealing-half of the cycle. (The term "half" here is used loosely, as ordinarily neither the port-opening and port-closing portion of the cycle nor the sealing portion of the cycle, is exactly half of the cycle, but merely lies mainly in the lower half and upper half of the cycle.) This travel-path shown in Fig. 10, produced by the structural arrangement shown in Fig. 9, is very effective for high-speed engines, because of the great axial height of the ports which can be obtained, and because the high-speed of the parts makes a wide sealing distance d less essential.

By the use of a non-co-planar wobble-crank drive, it thus becomes possible to control the relation between the height of the ports and the width of the sealing distance for a given axial movement of the sleeve-valve, to get an increased height of port or an increased sealing distance as desired.

This control is not only obtained by locating the valve-operating shaft below or above the socket 32, as indicated in Figs. 1 and 9 respectively, but by the design of the wobble-cranks themselves. By such design, it becomes possible to vary within wide limits the shape of the travel-path 21 as illustrated in either Fig. 3 or Fig. 10. The action of the wobble-crank 18, in producing the closed-curved travel-path 21, aside from its location above or below the socket 32, is made up of two components; which may be varied independently. One of these components is the eccentricity of the wobble-crank, or the distance of the axis of the valve-operating shaft 19 of the plane (which may be called plane g) which is parallel to that axis but is drawn through the axis of the wobble-crank itself; and this component controls the length of the axial reciprocation of the valve-sleeve. The other component is the angle of tilt of the wobble-crank from the plane (which may be called plane h) which is drawn through the axis of the valve-operating shaft perpendicular to plane g; and this component controls the extent of the circumferential oscillation of the sleeve-valve. Further, the length of the sleeve-connecting-rod 17 also helps to control the extent of circumferential oscillation of the sleeve-valve; for by increasing such length for a given angle of tilt of the wobble-crank it is possible to get a greater circumferential oscillation, or by increasing the angle of tilt of the wobble-crank for a given length of the sleeve-connecting-rod it is also possible to increase the extent of circumferential oscillation of the sleeve-valve. Thus by increasing the angle of tilt of the wobble-crank, it is possible to get a given extent of circumferential oscillation of the sleeve-valve with a shorter sleeve-connecting-rod; and vice versa. The eccentricity of the wobble-crank, the tilt of the wobble-crank, and the length of the sleeve-connecting-rod, may all be varied independently in the design of the engine; and thus the shape of the travel-path 21 may be varied within very wide limits, according to what shape is desired; for such travel-path is the resultant of all three of these things, and its shape may be varied by varying any one of them.

In this way, by the use of the non-co-planar wobble-crank drive for the sleeve-valve 16 it is possible to get any desired relation between the height of axial movement and the extent of circumferential oscillation of the sleeve-valve, within very wide limits; and it is possible to get any desired relation, within wide limits, between the height of port openings and the width of the sealing distance in a given total height of sleeve-valve movements. This is largely due to the fact that the mid-cycle line *e* of the travel-path 21 is non-coincident with the half-way line *f*, by an amount dependent upon the design of the wobble-crank, and in a direction dependent upon the location of the wobble-crank and its shaft with respect to the socket 32.

Because of these things, the wobble-shaft drive makes it possible to have great variations in the design of the travel-path 21, and great variations in the relation between the axial height of the ports and the sealing distance *d* between the sleeve-valve 16 and the plug 51. Further, the sealing which is produced between the sleeve-valve 16 and the plug 51 minimizes the effect of wear and inaccuracies of workmanship in the construction of the wobble-crank drive, saves the bearing surfaces of the valve-operating shaft, and makes it possible to use a smaller valve-operating shaft and a lighter chain-drive therefor.

I claim:

1. In an internal combustion engine, the combination of a cylinder, a piston, a sleeve-valve interposed between said cylinder and said piston and arranged to have both axial reciprocation and circumferential oscillation, a crank-shaft offset from the axis of the cylinder, a connecting-rod between said crank-shaft and said piston, a valve-operating shaft parallel to the crank-shaft and on the other side of the cylinder axis, said valve-opearting shaft having a wobble-crank whose path of travel overlaps that of said connecting-rod but which is cut away in the plane of swing of the connecting-rod to avoid interference therewith, and an operating connection from said wobble-crank to said sleeve.

2. In an internal combustion engine, the combination of a cylinder, a piston, a sleeve-valve interposed between said cylinder and said piston and arranged to have both axial reciprocation and circumferential oscillation, a crank-shaft, a connecting-rod between said crank-shaft and said piston, a valve-operating shaft parallel to the crank-shaft, sail valve-operating shaft having a wobble-crank whose path of travel overlaps that of said connecting-rod but which is cut away in the plane of swing of the connecting-rod to avoid interference therewith, and an operating connection from said wobble-crank to said sleeve.

3. In an internal combustion engine, the combination of a cylinder, a piston, a sleeve-valve interposed between said cylinder and said piston and arranged to have both axial reciprocation and circumferential oscillation, a crank-shaft offset from the axis of the cylinder, a connecting-rod between said crank-shaft and said piston, a valve-operating shaft parallel to the crank-shaft and on the other side of the cylinder axis, said valve-operating shaft having a wobble-crank, and an operating connection from said wobble-crank to said sleeve, said valve-operating shaft being closer to the cylinder axis than it could be save for such offsetting.

4. In an internal combustion engine, the combination of a cylinder, a piston, a sleeve-valve interposed between said cylinder and said piston and arranged to have both axial reciprocation and circumferential oscillation, a crank-shaft offset from the axis of the cylinder, a connecting-rod between said crank-shaft and said piston, a valve-operating shaft parallel to the crank-shaft and on the other side of the cylinder axis, said valve-operating shaft having a wobble-crank, and a sleeve-connecting-rod from said wobble-crank to said sleeve-valve, said sleeve-connecting-rod being bifurcated at its wobble-crank end to straddle the plane of swing of the first-named connecting-rod without interference.

5. In an internal combustion engine, the combination of a cylinder, a piston, a sleeve-valve interposed between said cylinder and said piston and arranged to have both axial reciprocation and circumferential oscillation, a crank-shaft offset from the axis of the cylinder, a connecting-rod between said crank-shaft and said piston, a valve-operating shaft parallel to the crank-shaft and on the other side of the cylinder axis, said valve-operating shaft having a wobble-crank, and a sleeve-connecting-rod from said wobble-crank to said sleeve-valve, said sleeve-connecting-rod being bifurcated at its wobble-crank end to straddle the plane of swing of the first-named connecting-rod without interference, and said operating shaft being sufficiently close to said cylinder axis so that the two connecting-rods would interfere ecept for such bifurcation.

6. In an internal combustion engine, the combination of a cylinder, a piston, a sleeve-valve interposed between said cylinder and said piston and arranged to have both axial reciprocation and circumferential oscillation, a crank-shaft, a connecting-rod between said crank-shaft and said piston, a valve-operating shaft parallel to the crank-shaft, said valve-operating shaft having a wobble-crank, and a sleeve-connecting rod from said wobble-crank to said sleeve-valve, said sleeve-connecting rod being bifurcated at its wobble-crank end to straddle the plane of swing of the first-named connecting-rod without interference.

7. In an internal combustion engine, the combination of a cylinder, a piston, a sleeve-valve interposed between said cylinder and said piston and arranged to have both axial reciprocation and circumferential oscillation, a crank-shaft, a connecting rod between said crank-shaft and said piston, a valve-operating shaft parallel to the crank-shaft, said valve-operating shaft having a wobble-crank, and a sleeve-connecting-rod from said wobble-crank to said sleeve-valve, said sleeve-connecting-rod being bifurcated at its wobble-crank end to straddle the plane of swing of the first-named connecting-rod without interference, and said valve-operating shaft being sufficiently close to said cylinder axis so that the two connecting-rods would interfere except for such bifurcation.

8. In an internal combustion engine, the combination of a cylinder, a piston, a sleeve-valve arranged to have both axial reciprocation and circumferential oscillation, a valve-operating shaft, said valve-operating shaft having a wobble-crank, and a sleeve-connecting-rod between said wobble-crank and said sleeve-valve, said sleeve-connecting-rod and said sleeve-valve having a ball-and-socket joint connection whose center is closer to the internal surface of the sleeve than the radius of the bearing surfaces of said ball-and-socket joint, the enumerated parts being arranged so that said ball-and-socket joint does not interfere with movement of the piston in the operation of the engine.

9. In an internal combustion engine, the combination of a cylinder, a piston, a sleeve-valve interposed between said cylinder and said piston and arranged to have both axial reciprocation and circumferential oscillation, said sleeve-valve being provided with a socket of a ball-and-socket joint, a valve-operating shaft having a wobble-crank, and a sleeve-connecting rod mounted on said wobble-crank, said sleeve-connecting rod having its end remote from the wobble-crank bent at an angle to the body of said sleeve-connecting rod and provided with a ball-member which cooperates with the socket on said sleeve-valve, the ball-member and the socket-member being so relatively shaped that by tilting the sleeve-connecting rod and the ball-member through a definite relative position the ball-member may be removed from or inserted in the socket-member.

10. In an internal combustion engine, the combination of a cylinder, a piston, a sleeve-valve interposed between said cylinder and said piston and arranged to have both axial reciprocation and circumferential oscillation, a crank-shaft, a connecting-rod between said crank-shaft and said piston, a valve-operating shaft parallel to the crank-shaft and having a wobble-crank, a sleeve-connecting rod mounted on said wobble-crank and having a ball-and-socket connection to said sleeve-valve, said sleeve-connecting rod being bifurcated to swing astride certain of the other elements in their movement and the valve-operating shaft being sufficiently close to the axis of the sleeve-valve so that said sleeve-connecting rod would interfere with other parts if it were not so bifurcated.

11. In an internal combustion engine, the combination of a cylinder, a piston, a sleeve-valve interposed between said cylinder and said piston and arranged to have both axial reciprocation and circumferential oscillation, a crank-shaft, a connecting-rod between said crank-shaft and said piston, a valve-operating shaft parallel to the crank-shaft and having a wobble-crank, a sleeve-connecting rod mounted on said wobble-crank and having a ball-and-socket connection to said sleeve-valve, the mounting of said sleeve-connecting rod on said wobble-crank being removed from the axial plane of the sleeve-valve perpendicular to the valve-operating shaft so that the valve-operating shaft may be located closer to the sleeve-valve axis.

12. In an internal combustion engine, the combination of a cylinder, a piston, a sleeve-valve arranged to have both axial reciprocation and circumferential oscillation, a valve-operating shaft, said valve-operating shaft having a wobble-crank, and a sleeve-connecting-rod between said wobble-crank and said sleeve-valve, said sleeve-connecting-rod and said sleeve-valve having a ball-and-socket joint connection whose center is closer to the internal surface of the sleeve than the radius of the bearing surfaces of said ball-and-socket joint, said sleeve-connecting-rod having a neck portion joining the body of the connecting rod with the ball member of said joint, and said neck portion where it joins said ball extending generally at an angle to the forces transmitted between the connecting rod and said sleeve-valve.

13. In an internal combustion engine, the combination of a cylinder, a piston, a sleeve-valve interposed between said cylinder and said piston and arranged to have both axial reciprocation and circumferential oscillation, said sleeve-valve being provided with a socket of a ball-and-socket joint, a valve-operating shaft having a wobble-crank, and a sleeve-connecting rod mounted on said wobble-crank, said sleeve-connecting rod having its end provided with a ball-member which cooperates with the socket on said sleeve-valve, said ball member being offset from the center line of said sleeve-connecting rod, the distance between the inner surface of said sleeve and the center of said socket being less than the radius of the engaging faces of the ball and socket.

In witness whereof, I have hereunto set my hand at Indianapolis, Indiana, this 10th day of April, A. D. one thousand nine hundred and twenty-six.

JULES HALTENBERGER.